United States Patent [19]

Reece et al.

[11] Patent Number: 4,854,613

[45] Date of Patent: Aug. 8, 1989

[54] COMPOSITE CONNECTING MEMBER FOR HYDRAULIC FLUID LINES

[75] Inventors: Marvin P. Reece, Dana Point; Wilhelm F. Schepergerdes, El Toro; Frampton Renfrow, Costa Mesa, all of Calif.

[73] Assignee: Rexnord Holdings Inc., Torrance, Calif.

[21] Appl. No.: 148,900

[22] Filed: Jan. 27, 1988

[51] Int. Cl.$^4$ ............................................. F16L 35/00
[52] U.S. Cl. ....................................... 285/39; 285/55; 285/92; 285/110; 285/175; 285/354; 285/369; 285/917
[58] Field of Search ...................... 285/55, 53, 39, 110, 285/92, 354, 369, 917, 175

[56] References Cited

U.S. PATENT DOCUMENTS

| 779,169 | 1/1905 | MacDonald | 285/55 |
|---|---|---|---|
| 3,702,707 | 6/1971 | Rosan, Sr. | |
| 4,602,807 | 7/1986 | Bowers | 285/55 X |

FOREIGN PATENT DOCUMENTS

| 465991 | 5/1973 | Australia | 285/55 |
|---|---|---|---|
| 2333465 | 2/1978 | Fed. Rep. of Germany | 285/55 |
| 408568 | 9/1966 | Switzerland | 285/55 |
| 24355 | of 1904 | United Kingdom | 285/55 |
| 964361 | 7/1964 | United Kingdom | 285/55 |

OTHER PUBLICATIONS

Page 1 only, Rexnord Brochure, Rosan Products, Rosan RF9800-13 and RF9900-13 Series Adapters.
Page 1 only, Rexnord Brochure, Rosan Products, Rosan RF5000-13 Series Adapter.
English Translation of Swiss Patent No. 408,568 to Weissenberger.
English Translation of German Patent No. 26 23 465.

Primary Examiner—Dave W. Arola
Attorney, Agent, or Firm—Pretty, Schroeder, Brueggemann & Clark

[57] ABSTRACT

A connecting member is disclosed for connecting a hydraulic tube to a base material such as a housing or to another hydraulic tube. The connecting member has an annular body formed from a first material extending a substantial length of the connecting member. The body has an interior surface defining a passageway. The body includes threads on a first portion of the body for connecting to the connecting member of a hydraulic tube and threads on a second portion of the body for connecting the connecting member to the base material or a second hydraulic tube through a coupling nut. A sleeve is made from a second material and extends through the passageway substantially the length of the connecting member. The sleeve has an internal surface and has a pair of ends, wherein each end of the sleeve extends radially outwardly from the sleeve relative to a central longitudinal axis of the sleeve over a respective end of the body. The body may be plastic and the sleeve may be titanium.

10 Claims, 6 Drawing Sheets

COMPOSITE CONNECTING MEMBER FOR HYDRAULIC FLUID LINES

BACKGROUND OF THE INVENTION

1. Field Of The Invention

The present invention relates to composite connecting members in the form of couplings and fittings for hydraulic fluid lines, and specifically to couplings and fittings having a body made from a first material formed about a second material.

2. Related Art

Fittings for providing a leak-proof attachment between a hydraulic or other fluid conducting tube and associated hardware, such as actuators, manifolds, etc., are well-known. One type of well-known fitting is that shown in the Rosan Sr. patent, U.S. Pat. No. 3,702,707, incorporated herein by reference.

One form of such a hydraulic fitting is shown in FIG. 1, labeled as prior art. The fitting combination 10 includes a fitting 12 threaded into a parent or base material 14 through external threads 16. The parent material may be steel, aluminum or any other material forming the particular housing or hardware to which a fluid connection is to be made. A cavity 18 connects a passage way 20 through which the fluid is passed. The fluid may be hydraulic or pneumatic and under working pressure up to 8,000 psi, for example.

The fitting 12 includes an O-ring groove 22 for maintaining an O-ring 24 against a first counterbore 26 in the parent material. The O-ring groove is located on the outer surface of the fitting between the threads 16 and a conically shaped, upwardly diverging surface 28. The conically shaped surface 28 terminates at a series of longitudinally extending serrations 30, which extend in a direction parallel to a central axis 32 of the fitting combination. The fitting is held in threaded engagement with the base material 14 by a lock ring 34 having internal serrations 36 that mate with the external serrations 30 on the fitting. The lock ring further includes external serrations 38 for engaging the parent material in a second counterbore 40. The lock ring 34 prevents rotation of the fitting relative to the parent material, thereby preventing the fitting from backing out of the parent material when under operating conditions. The longitudinally extending serrations 30 on the fitting, in conjunction with the serrations on the lock ring, are also used for tightening down the fitting into the parent material or removing the fitting, with an appropriate tool (not shown).

The fitting 12, on an upper or second end portion 42, includes external threads 44 for engaging a coupling nut (not shown) for a hydraulic fluid line. The coupling element threadably engages the fitting at the upper portion thereof so that a seal can be formed between the hydraulic tubing and the second end portion 42 of the fitting.

The fitting shown in FIG. 1, when used for high pressure applications, is typically manufactured from a metal, such as aluminum, titanium or steel. Fittings such as are made from the above-mentioned materials form, when taken in aggregate for such applications as with aircraft, etc., a non-neglible part of the total weight of the aircraft.

Couplings for connecting a pair of hydraulic tubes together are also well known.

SUMMARY OF THE INVENTION

A connecting member for connecting a hydraulic tube to a base material or to a second hydraulic tube includes an annular body formed from a first material. The material may be a plastic or an advanced composite. The body extends a substantial length of the connecting member and has an interior surface defining a passageway. The body further includes means along a first portion of the body for connecting the connecting member to a hydraulic tube. The mounting means may be in the form of threads so that the coupling body may be threadably engaged with a coupling nut of the hydraulic tube. Means are provided on a second portion of the body for connecting the connecting member to the base material or to a second hydraulic tube through a coupling nut. The mounting means may be in the form of threads to be threadably engaged with the base material such as the housing of an actuator, etc. or the coupling nut. A sleeve, formed from a second material, extends through the passageway substantially the length of the connecting member. The sleeve may be manufactured from a material such as titanium, aluminum or steel. The sleeve comprises an internal surface and a pair of ends wherein each end of the sleeve extends radially outwardly from a central longitudinal axis of the sleeve over a respective end of the body.

The coupling provides a light-weight, easily manufactured hydraulic connecting member which can be used in many applications, including those requiring relatively high-pressures. The connecting member may be suitable for such applications depending upon the particular pressure requirements for the application.

DETAILED DESCRIPTION OF THE PREFERRED EMBODIMENTS

Figure 1:
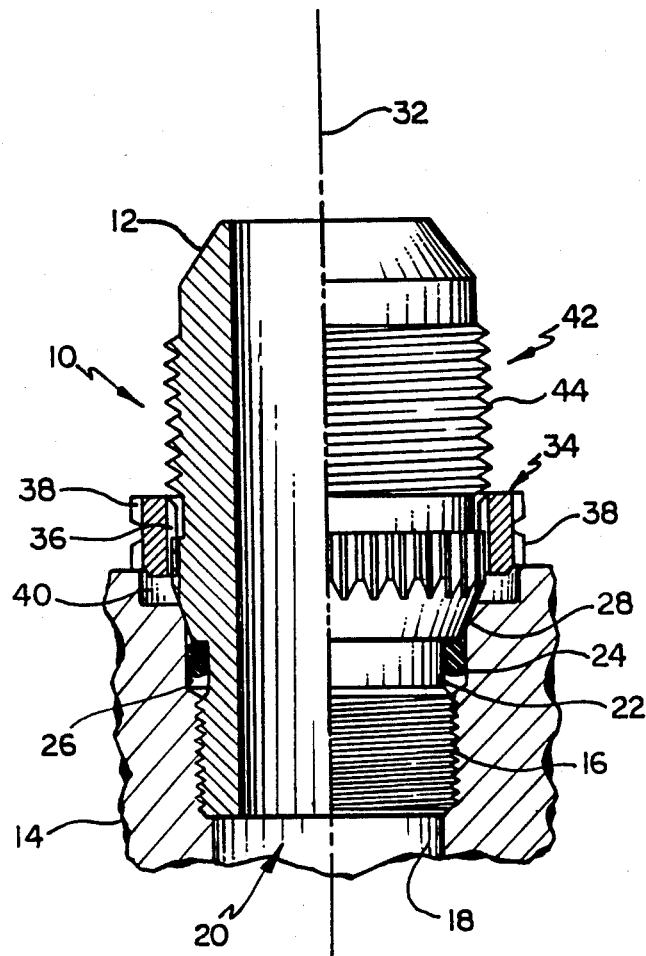
FIG. 1 shows a side elevation and partial cut-away view of a prior art fitting mounted in a base material to be substantially fixed therein using a lock ring.

A connecting member in the form of a fitting 46 (FIG. 2), part of a fitting combination such as that shown in FIG. 1 for mounting a hydraulic tube to a base material, includes an annular fitting body 48 and a sleeve 50. The fitting body 48 includes a lower portion or first end portion 52 and an upper or second end portion 54. The terms "lower" and "upper" refer to the orientation of the fitting in FIG. 2, but are not intended to limit the description or use of the fitting to any particular orientation. The interior of the fitting body is generally cylindrical about a central axis 56 extending longitudinally through the fitting body. The interior surface of the fitting body is generally co-axial with the central axis 56. Generally, however, the interior surface of the fitting body will conform to the exterior surface of the sleeve 50 since the fitting will typically be formed in an injection molding process using the sleeve 50 as a core. Therefore, any surface variation in the external surface of the sleeve will be complimented by the internal surface of the fitting body. (See the discussion below with respect to FIG. 4.) Similarly, the ends of the fitting body conform to the respective ends of the sleeve since the ends extend radially outwardly from the central axis 56, as described more fully below. External threads 58 are formed around the circumferential surface of the first end portion 52 for mounting the fitting body to a base material. The threads are formed from the end of the fitting body upwardly to an O-ring groove 60 similar to that described with respect to FIG. 1 for accommodating the O-ring 24. The O-ring groove 60 extends circumferentially around the entire outer surface of the fitting body.

Figure 3:
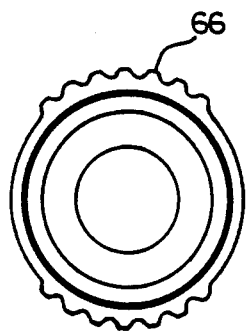
FIG. 3 is an end plan view of a fitting such as is shown in FIG. 2.

A conically-shaped, upwardly diverging surface 62, similar to that described with respect to surface 28 of FIG. 1, extends radially outwardly and upwardly toward the second end 54 of the fitting body for providing a seating surface with the base material when the fitting body is threaded into the base material. The conically-shaped surface terminates at its outer most extent in an at least partially serrated surface for engaging a lock ring similar to that described above with respect to the lock ring 34 in FIG. 1. The surface 64 includes serrations 66, as shown in FIG. 3, around at least a portion of the circumferential surface thereof. Other appropriate means for engaging a lock ring may be provided such that engagement of the lock ring with a base material prevents rotation of the fitting body with respect to the base material to prevent the fitting from backing out. The surface 64 extends upwardly toward the second end portion 54 and terminates at a radially inwardly extending shoulder 67. Alternatively, the surface 64 may terminate in a surface sloping inwardly toward the threads 68 (described below).

Figure 2:
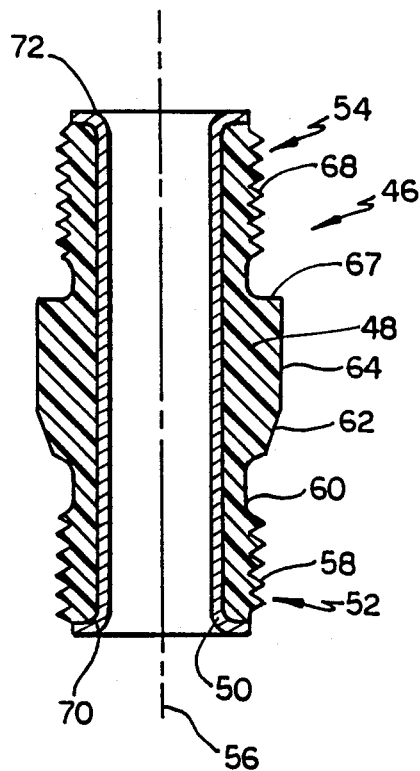
FIG. 2 is a longitudinal cross-section of a fitting according to the present invention.

The second end portion 54 extends upwardly (as seen in FIG. 2) from the shoulder 67 to the second end of the fitting body. A substantial portion or the entire portion of the second end portion includes threads 68 about the circumferential surface thereof for coupling a high-pressure hydraulic tube to the fitting through a coupling nut on the tube.

The fitting body is preferably made from a light, but high strength plastic or composite material. The fitting body is preferably fiber or glass reinforced and may be formed from a material such as that offered by General Electric under the trademark ULTEM 2400. Use of the ULTEM plastic results in a fitting which is approximately 18 percent lighter than a fitting formed entirely from titanium.

The sleeve 50 is a generally right circular cylindrical tube extending the length of the fitting body, and includes a first end flange 70, extending substantially radially outwardly from the central axis 56 forming a rim or lip on the first end of the sleeve. The first end flange extends over and substantially covers the first end of the fitting body so that the face of the first end of the fitting body is covered by the first end flange of the sleeve.

The first end flange 70 serves to retain the sleeve in the fitting body even under the high hydraulic pressure developed around the fitting under normal operating conditions. The first end flange 70 also tends to counter any upward force developed in the fitting body due to the high pressure in the hydraulic fluid line pulling the second end portion 54 away from the base material 93 (FIG. 7) and the first end portion 52.

Figure 4:
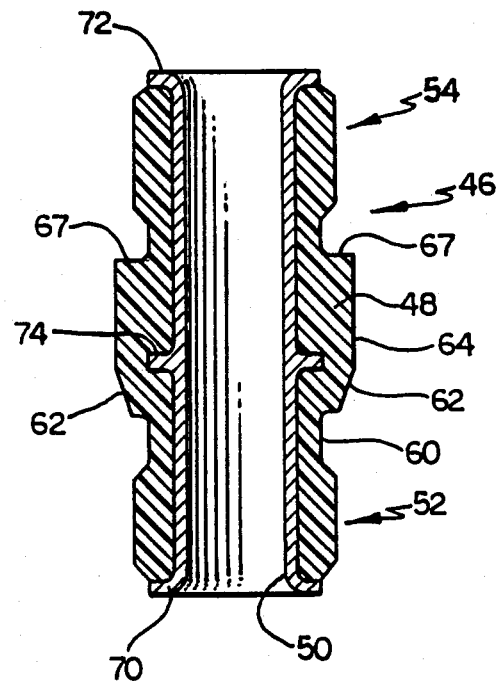
FIG. 4 is a longitudinal cross-section of a fitting according to a further embodiment of the present invention.
Figure 7:
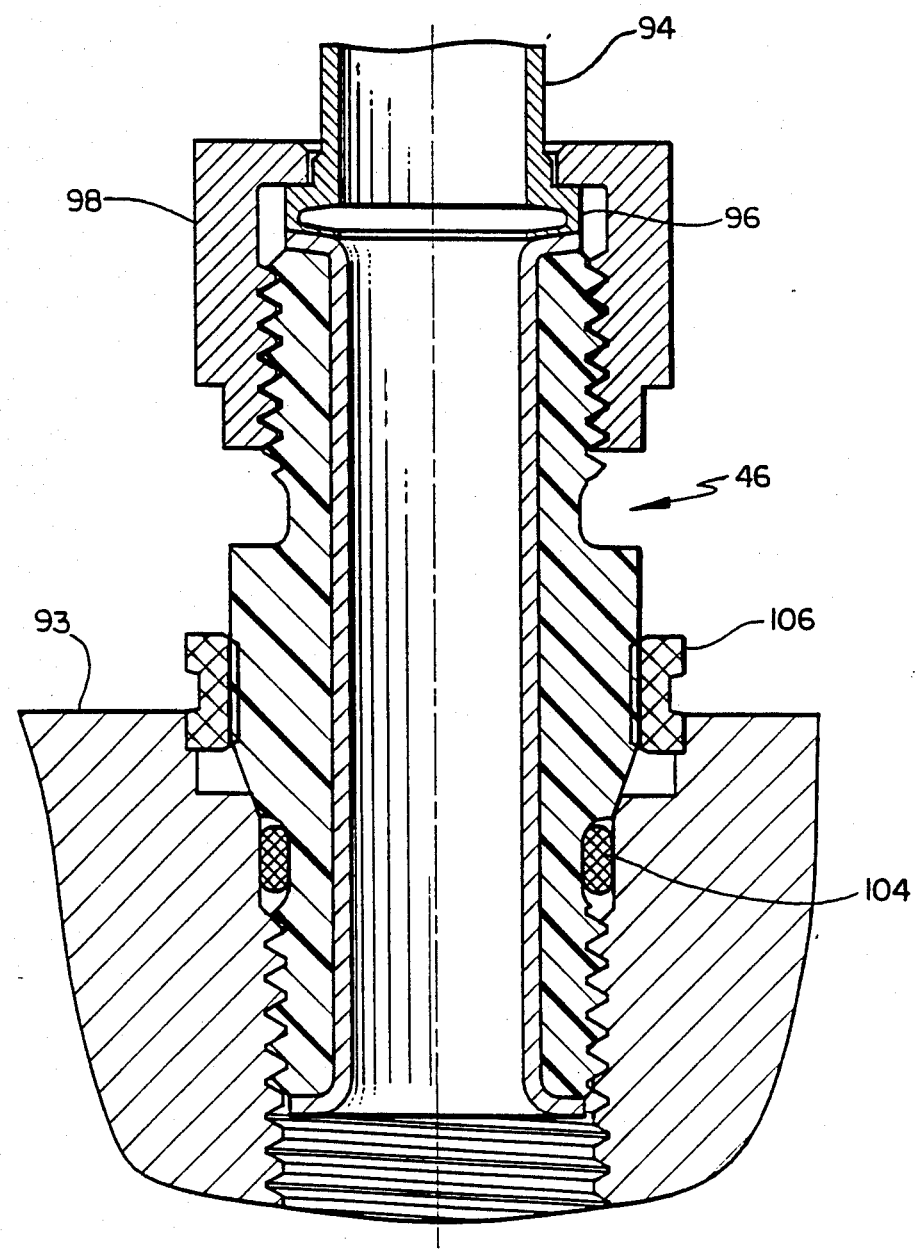
FIG. 7 is a side-sectional view of a fitting according to the present invention mounted in a base material to be substantially fixed therein using a lock ring and having a hydraulic tube connected thereto.

At the opposite end of the sleeve from the first end flange, a second end flange 72 extends substantially radially outwardly from the sleeve relative to the central axis 56. The second end flange may extend outwardly and slightly upwardly at an angle from the central axis to allow a strong seal to be formed between the hydraulic tubing 94 (which could have a beam seal tube end 96 as shown in FIG. 7) and the metal surface of the second end flange on the sleeve. The hydraulic tube is coupled to the fitting through the coupling nut 98 (FIG. 7). Alternatively, the second end flange may be configured relative to the remainder of the sleeve so as to accommodate flared or flareless tube ends. In the case of a sleeve for accommodating flared or flareless tube ends, the sleeve may be machined to have the proper configuration as would be known to one skilled in the art. In each configuration, each end of the sleeve will extend over and cover a substantial portion or all of the respective end of the body as shown in FIGS. 2 and 4. Additionally, these configurations still have the body extend a substantial length of the fitting.

The sleeve serves to provide a reliable seal between the fitting and the hydraulic tube at the second end flange 72. The sleeve also provides a high strength member which allows the fitting combination to withstand significant hydraulic pressures when the fitting is in place in a parent material. In the present embodiment, the cross-sectional area of the sleeve at the O-ring groove of the fitting is approximately 24 percent of the total cross-sectional area of the fitting at the O-ring groove. The end flanges on the sleeve assist in holding the fitting body in the parent material even ween high pressure is developed around the fitting. The threads on the first end portion 52 fix the fitting in the parent material while the hydraulic pressures developed in the hydraulic tubing and the fitting tend to displace the second end portion 54 and the conically shaped surface 62 away from the parent material. The second end flange 72 helps to maintain the fitting body intact, as discussed above, against this displacement force.

The sleeve may be manufactured from titanium, steel, aluminum or other high strength material. Preferably, the sleeve is formed from a material which is nonreactive with typical hydraulic fluids used in high pressure applications. Also, the sleeve is preferably a material stronger than the fitting body to withstand longitudinal and radial forces developed through the pressure of the fluid passing through the fitting.

Figure 5:
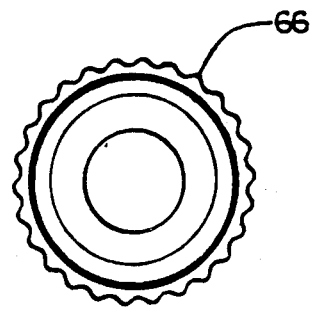
FIG. 5 is an end plan view of a fitting similar to that shown in FIG. 3.

The serrations 66 shown in FIG. 3 are shown as extending around only a portion of the circumference of the fitting. The serrations engage complimentary internal serrations on a lock ring, such as that shown in FIG. 1. FIG. 5 shows an alternative embodiment for the serrations for the fitting body extending around the entire circumferential surface of the fitting between the conically shaped surface 62 and the shoulder 67 of the fitting body.

In an alternative embodiment shown in FIG. 4, the sleeve includes at least one projection or intermediate flange 74 extending circumferentially around the outside surface of the sleeve at a longitudinal position approximately intermediate to the first and second end flanges of the sleeve. In a preferred embodiment, the flange is located relative to the fitting body closer to the conically shaped surface 62, than to the shoulder 67. It is believed that the projection or intermediate flange may provide additional support to the fitting body when the fitting is in place in a housing and under pressure. For example, the intermediate flange (or flanges where more than one intermediate flange is used) would oppose any shear forces developed between the sleeve and the fitting body. Threads are not shown for simplicity on end portions 52 and 54 of FIG. 4 though it will be understood that they exist for their stated function.

In a further embodiment of the fitting combination similar to that shown in FIG. 4, the sleeve may have alternating ridges and grooves to provide multiple intermediate flanges. Alternatively, the ridges and grooves may be smoothed somewhat so that there are no 90 degree corners on the intermediate flanges. Other surface discontinuities may be provided on the external surface of the sleeve to achieve the same or similar results.

The fitting is made by manufacturing a sleeve with flanged end portions and possibly intermediate flanges or other discontinuities. The sleeve may be manufactured from a titanium tube and the flanges formed by flaring or upsetting the ends of the tube to expand the ends of the tube radially outwardly as shown in FIG. 2. Additionally, discontinuities may be created as would be known to one skilled in the art.

The fitting body is formed about the sleeve through an injection molding process or like operation to provide the characteristics for the fitting body described above with respect to FIGS. 2-5, as would be known to one skilled in the art. For example, the sleeve may be placed on a mandrel and placed in a mold for producing the desired outer dimensions of the fitting body. An appropriate material is injected into the mold and allowed to set as would be known to one skilled in the art. The plastic is allowed to set and the fitting is removed from the mandrel and processed as necessary to place the fitting combination in final form. This process of making the fitting is preferred over machining because the fibers in any composite material would not be disturbed when the threads on the fitting body are formed and the fibers would orient themselves about the lines of the mold. Injection molding would also be more economical.

Figure 6:
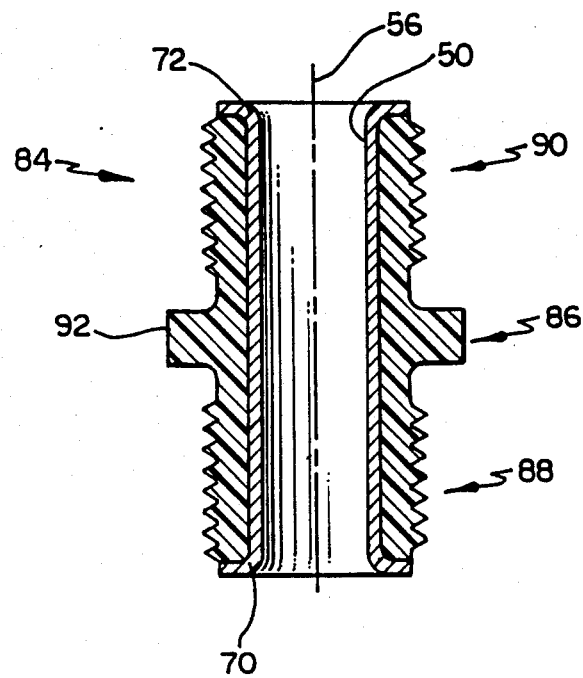
FIG. 6 is a longitudinal cross-section of a coupling according to the present invention.
Figure 8:
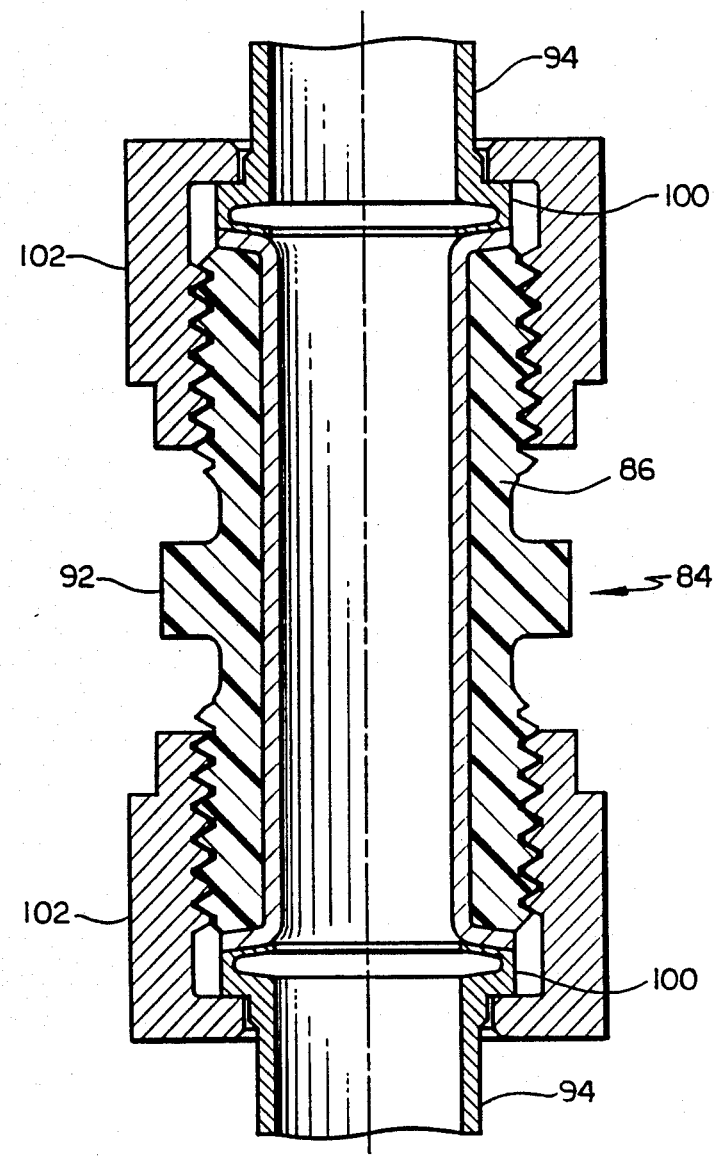
FIG. 8 is a side-sectional view of a coupling having two hydraulic tubes connected thereto.

The configurations described above with respect to the fitting body of FIGS. 2 and 4 can be modified so as to form a preferred embodiment of the connecting member as shown in FIG. 6 for coupling two hydraulic tubes together. The coupling 84 includes the sleeve 50 substantially the same as that previously described (or its alternatives), and a body 86. The internal dimensions of the body will conform to the outside dimensions of the sleeve as described above. The outer configuration of the sleeve is generally such that the upper and lower portions of the body are substantial mirror images of each other about a transverse plain through the middle of the body. In the embodiment of FIG. 6, the sleeve includes first and second end flanges 70 and 72 formed so as to be able to mate with a beam seal tube end 100 (FIG. 8). The coupling includes a first set of threads 88 on the lower portion of the coupling and a second set of threads 90 on the upper portion of the coupling. The length of the threads on the upper and lower portions of the coupling are preferably the same. A radially extending shoulder 92 extends outwardly from the surface of the body of the coupling b which a tool can be used to hold the coupling 84 while coupling nuts 102 are threaded onto the threaded portions in order to connect respective tube ends. Holes or other means may be formed in the shoulder for attaching lock wires from the coupling nuts to prevent the coupling nuts from backing off the coupling once the coupling nuts are seated as is known. The shoulder may have longitudinally extending serrations around the outer circumferential surface thereof for accepting a tool having complementary serrations. Alternatively, the shoulder may include wrenching flats for accepting a suitable wrench. The materials of the sleeve and of the body are preferably the same as those described with respect to the previous embodiments.

FIG. 7 shows the fitting 46 threaded into the base material 93. The fitting includes an O-ring 104 for sealing the fitting against a counterbore in the base material. The fitting is held in the base material by a lock ring 106 having internal serrations mating with the external serrations on the fitting. External serrations on the lock ring engage the base material at a second counterbore in the base material. The external threads on the upper portion of the fitting accepts the coupling nut 98 on the hydraulic tubing 94 for forming a suitable seal between the end of the beam seal tube 96 and the sloped second end flange on the fitting.

FIG. 8 shows the coupling 84 having two hydraulic beam seal tubes 94 connected thereto through respective coupling nuts 102. Each beam seal tube forms a suitable seal between the respective end 100 of the tube and the corresponding end flanges.

It should be noted that the above embodiments are preferred, but others are forseeable. The described embodiments of the invention are only considered to be preferred and illustrative of the inventive concepts; the scope of the invention is not to be restricted to such embodiments. Various and numerous other arrangements may be devised by one skilled in the art without departing from the spirit and scope of the invention.

We claim:

1. A connecting member for connecting a hydraulic tube to a base material or to a second hydraulic tube, the connecting member comprising:

an annular body formed from a plastic material extending a substantial length of the connecting member, having an interior surface defining a passageway, and including thread means along a surface of a first portion of the body for threadably connecting the connecting member to a hydraulic tube through a coupling nut and thread means along a surface of a second portion of the body for threadably connecting the connecting member to the base material or to the second hydraulic tube and further including an end surface at each end of the body wherein each end surface extends outward at least radially from the passage to the respective surface having the thread means; and a sleeve comprised of a metallic material extending through the passageway substantially the length of the connecting member, comprising an internal surface defining a conduit through which hydraulic fluid may pass, and comprising a pair of ends, wherein each end of the sleeve extends at least partially radially outwardly from the sleeve relative to a central longitudinal axis of the sleeve over a respective end surface of the body.

2. The connecting member as claimed in claim 1 wherein the sleeve comprises a titanium sleeve.

3. The connecting member as claimed in claim 1 wherein the sleeve comprises an aluminum sleeve.

4. The connecting member as claimed in claim 1 wherein the plastic material comprises a reinforced plastic material.

5. The connecting member as claimed in claim 1 further comprising means on the body for engaging a tool for holding the connecting member.

6. The connecting member as claimed in claim 1 wherein the sleeve comprises an outer surface having at least one projection extending radially outwardly from the outer surface of the sleeve.

7. The connecting member as claimed in claim 6, wherein the projection extends radially outward from the outer surface of the sleeve at a location approximately midway between the pair of ends of the sleeve.

8. The connecting member as claimed in claim 1 further comprising a sloped external surface and a housing to which the connecting member is connected having a channel confluent with the conduit in the sleeve, a threaded portion in the channel engaging the second portion of the body and an engagement portion engaging the sloped surface of the body, and wherein the connecting member further comprises a tube connected to the first portion of the body through a threaded coupling nut wherein a surface of the tube contacts a surface of the sleeve.

9. The connecting member as claimed in claim 1 further comprising a hydraulic tube connected to the first portion of the body through a coupling nut and a second hydraulic tube coupled to the second portion of the body through a further coupling nut.

10. The connecting member as claimed in claim 9 further comprising tool accepting means between the means along the first portion of the body and the means on the second portion of the body for accepting a tool for holding the connecting member.

* * * * *